(12) United States Patent
Khalili (10) Patent No.: US 7,142,438 B2
(45) Date of Patent: Nov. 28, 2006

(54) EXTENDED OUTPUT RANGE SWITCHING POWER SUPPLY WITH CONSTANT POWER FEATURE

(75) Inventor: Rafik Khalili, Yorba Linda, CA (US)

(73) Assignee: Stellar Power, Inc., Irvine, CA (US)

( * ) Notice: Subject to any disclaimer, the term of this patent is extended or adjusted under 35 U.S.C. 154(b) by 0 days.

(21) Appl. No.: 10/460,347

(22) Filed: Jun. 11, 2003

(65) Prior Publication Data

US 2004/0032241 A1    Feb. 19, 2004

Related U.S. Application Data

(60) Provisional application No. 60/387,730, filed on Jun. 11, 2002.

(51) Int. Cl.
*H02M 3/335* (2006.01)
(52) U.S. Cl. .......................................... 363/20; 363/49
(58) Field of Classification Search ................ 363/62, 363/89, 60, 65, 24, 40, 133, 163, 49, 59, 363/124, 84, 74, 39, 20; 323/266, 268, 282, 323/223, 222, 207, 259; 307/109, 110, 9.1, 307/10.1
See application file for complete search history.

(56) References Cited

U.S. PATENT DOCUMENTS

| | | | | |
|---|---|---|---|---|
| 3,786,219 A | * | 1/1974 | Kornrumpf et al. | 219/626 |
| 5,103,388 A | * | 4/1992 | Williams et al. | 363/69 |
| 5,345,376 A | * | 9/1994 | Nourbakhsh | 363/62 |
| 5,886,885 A | * | 3/1999 | Fujie | 363/49 |
| 6,493,242 B1 | * | 12/2002 | Riggio et al. | 363/16 |
| 6,657,417 B1 | * | 12/2003 | Hwang | 323/222 |

* cited by examiner

*Primary Examiner*—Rajnikant B. Patel (57) ABSTRACT

The Invention is a 360 watt bench has an exceptionally wide output range that allows it to replace up to four conventional units. The output voltage can be manually adjusted with coarse and fine controls from zero to 75 volts. At the low voltage end, 60 amps of output current is available up to 6 volts, and beyond that, the power is limited to 400 watts. The power supply can operate in constant voltage or constant current mode, and a current setting control can adjust the maximum current down to zero from the value set by the automatic power limit. The principle may be applied to any power level and combination of voltage and current, and any method of manual or programming control.

2 Claims, 9 Drawing Sheets

EXTENDED OUTPUT RANGE SWITCHING POWER SUPPLY WITH CONSTANT POWER FEATURE

Pursuant to 35 U.S.C. §119(e) and any other applicable provisions, this application hereby claims priority to U.S. patent application Ser. No. 60/387,730, filed on Jun. 11, 2002. The contents of U.S. patent application Ser. No. 60/387,730, and of any other U.S. patent or other reference, if any, cited in this application, are hereby incorporated by reference.

BACKGROUND-FIELD OF INVENTION

This invention relates to the ac-dc power supply converters, specifically to such power supplies used in providing power to products being developed and or tested.

BACKGROUND-DESCRIPTION OF PRIOR ART

Many variable output bench-type power supplies have been produced, with the vast majority being of the linear type. These have either limited output range and power, or are very large, heavy and cumbersome in relation to this invention which weighs only 9 lbs and measures only 6"(h)×3.5"(w)×11"(d). Switching type bench power supplies are available, but a truly wide range power supply suitable for telecommunications testing at the higher voltage end, and high current DC to DC module testing at the lower voltage end does not exist in such a compact and efficient form, or it is necessary to use three or four different individual models to cover the complete range to perform equivalent duties that this invention performs individually.

SUMMARY

This invention is an exceptionally wide output range ac to dc switching power supply comprised of unique combination of preferred circuits, including but not limited, to power factor correction, buck converter, dual-interleaved forward converters with current doubling output circuit, and a unique automatic constant power limiting circuit. This combination allows a very compact and efficient assembly which provides such an extended range that it can carry out the same duties that it currently takes 3 to 4 larger and more cumbersome conventional units to do. This in effect may obsolete the current technology and units.

DRAWINGS AND FIGURES

FIG. 1 (A&B). Schematic of the input board showing the input filter, input rectifier, PFC correction boost converter, bias converter and buck converter.

FIG. 2 (A&B). Schematic of a preferred embodiment of an output board showing the dual forward output converter and current doubling output stage.

FIG. 3 (A&B). Schematic of a preferred embodiment of an front panel control board showing the error amplifiers for the voltage and current control, the pulse width modulator which controls the buck regulator, the constant power circuit and the voltage and current indicators.

DESCRIPTION

The present invention provides for a single output AC to DC converter with a wide range input and extended variable output range using switch-mode techniques to achieve a very compact power supply intended partly, but not exclusively as a bench supply for testing other equipment. The invention combines a particular combination of circuits to achieve the wide range variable output, and a novel automatic constant power control that allows high current at low output voltage, and less current at higher output voltages. From input to output the circuits employed preferably include but are not limited to the following: 1) input rectifier means, 2) power factor correction boost converter, 3) capacitive storage means, 4) buck converter which provides constant and controlled bus voltage for 5) dual forward converters acting as a push-pull converter which provide power to an output isolation transformer, 6) output rectifier and filter, 7) front panel control circuit. In the preferred embodiment manual controls provide control of output voltage, and maximum output current limit with settable constant current mode of operation. Preferably but not limited to a pulse width modulator circuit on the front panel controls the output of the buck regulator in response to the setting of the manual controls via a small coupling transformer. There is no modulation of the dual forward converters, and consequently they operate at full pulse width with zero voltage switching with high efficiency. Digital indicators display output voltage and current separately. Included is a separate low power fly-back converter that provides power for the control circuits, front panel indicators, integral cooling fan, and an auxiliary low current 5 volt DC output which is brought out to the front panel.

Figure 1A:
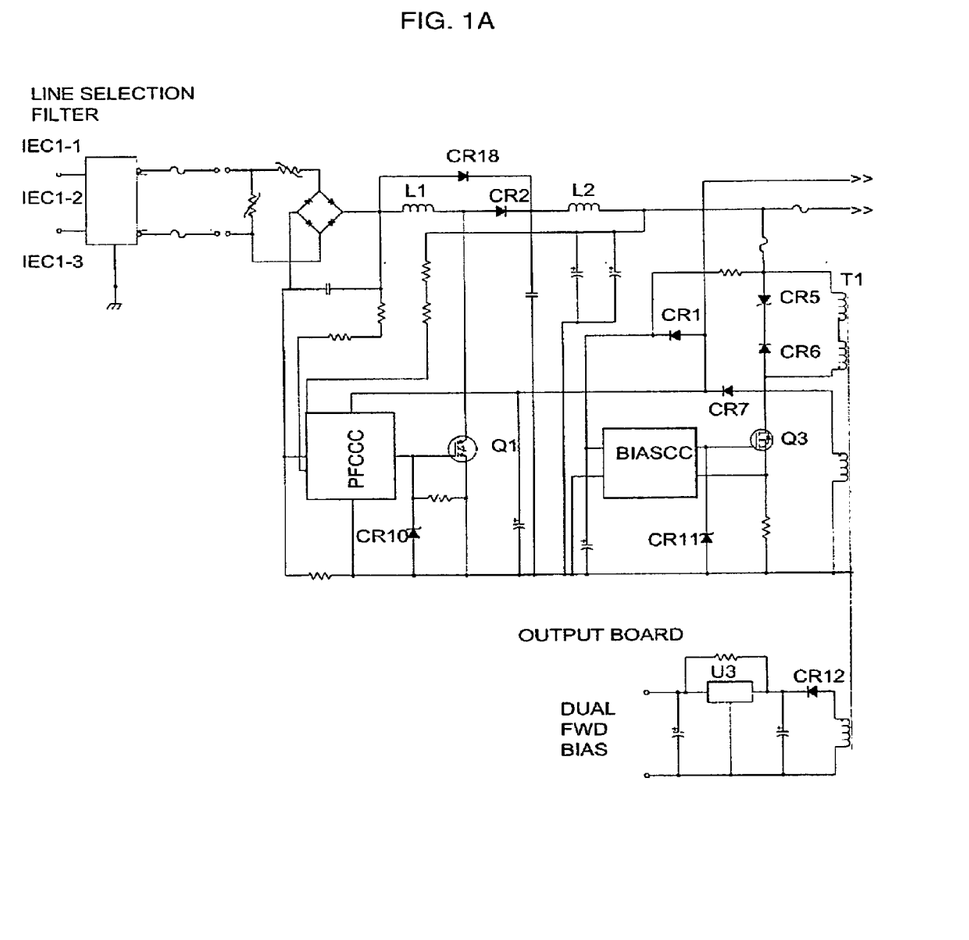
Figure 1B:
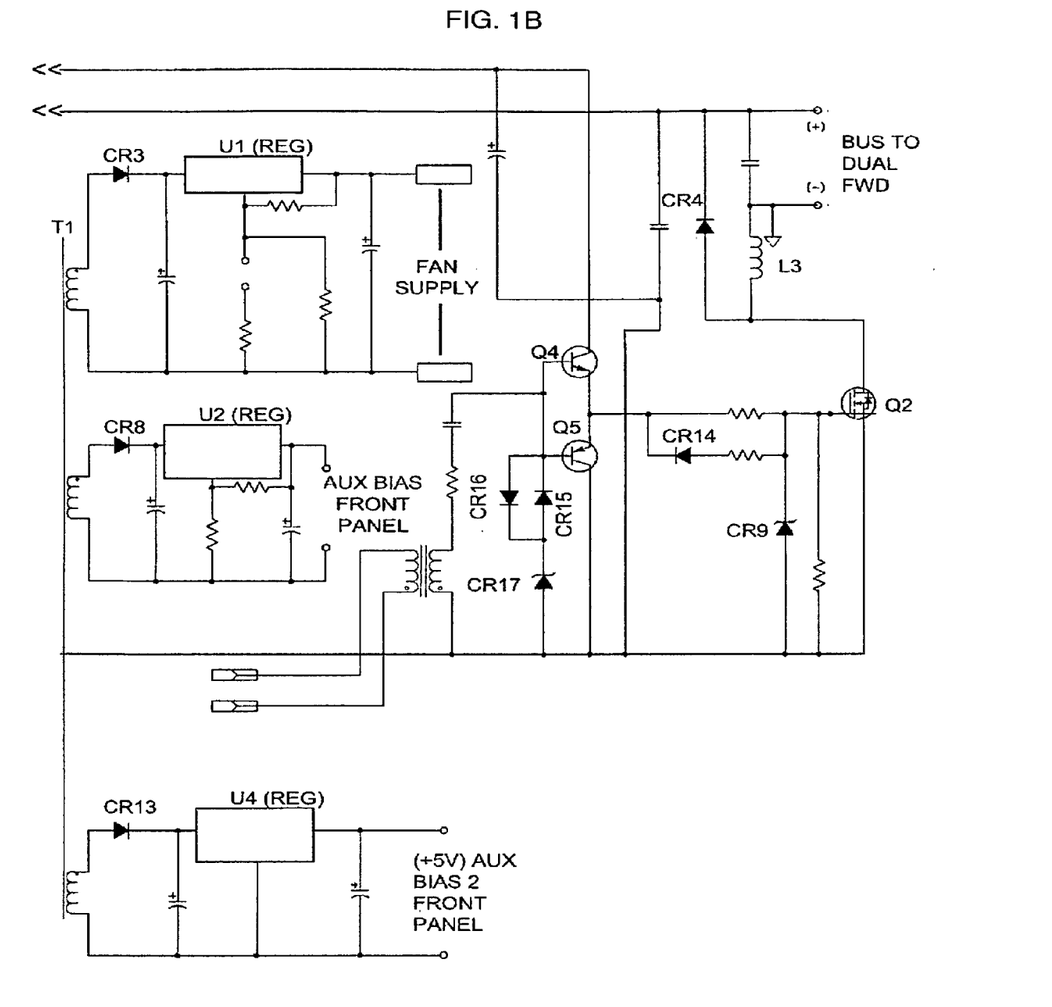
Figure 4:
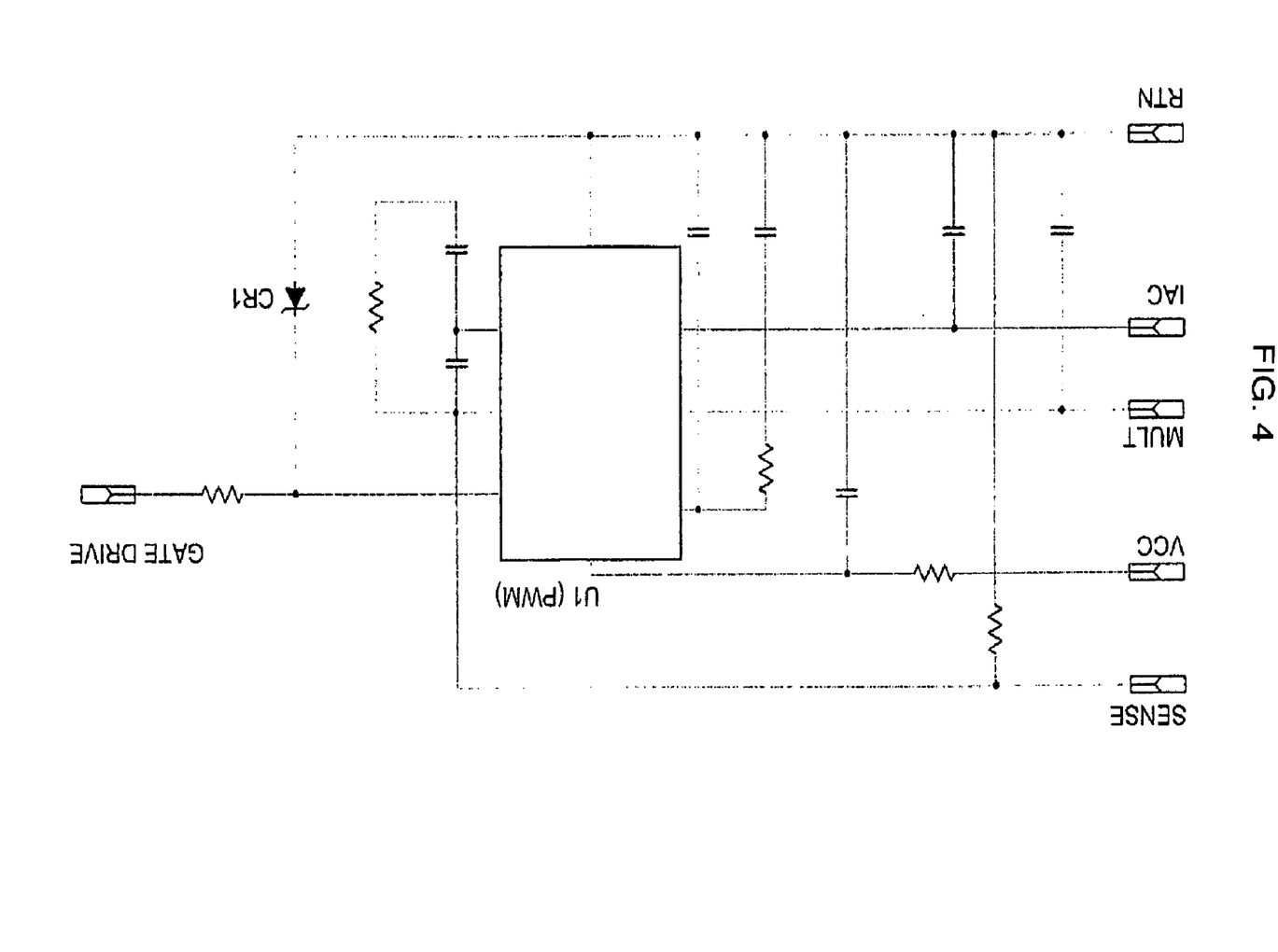
FIG. 4. Schematic of a preferred embodiment of an PFC control board.

The inclusion of active power factor correction on the front end lowers the input harmonic currents to meet international standards, and gives a universal AC input voltage range of 90 volts to 264 volts rms. All features are housed in an enclosure 6 inches high by 3.4 inches wide by 12 inches deep which meets the need for a compact unit. Referring to FIG. 1, the input AC power is filtered using a shielded line filter and rectified by BR1. A standard power factor control method is used (FIG. 4) which controls the switching of the boost IGBT Q1 which in combination with the inductor L1 and diode CR2 provides a constant voltage across C15 and C16 of 380V DC, and also controls the current taken from the AC line to be in phase and the same wave-shape as the rectified line voltage across C7. A power factor of close to 1 is achieved.

Figure 6:
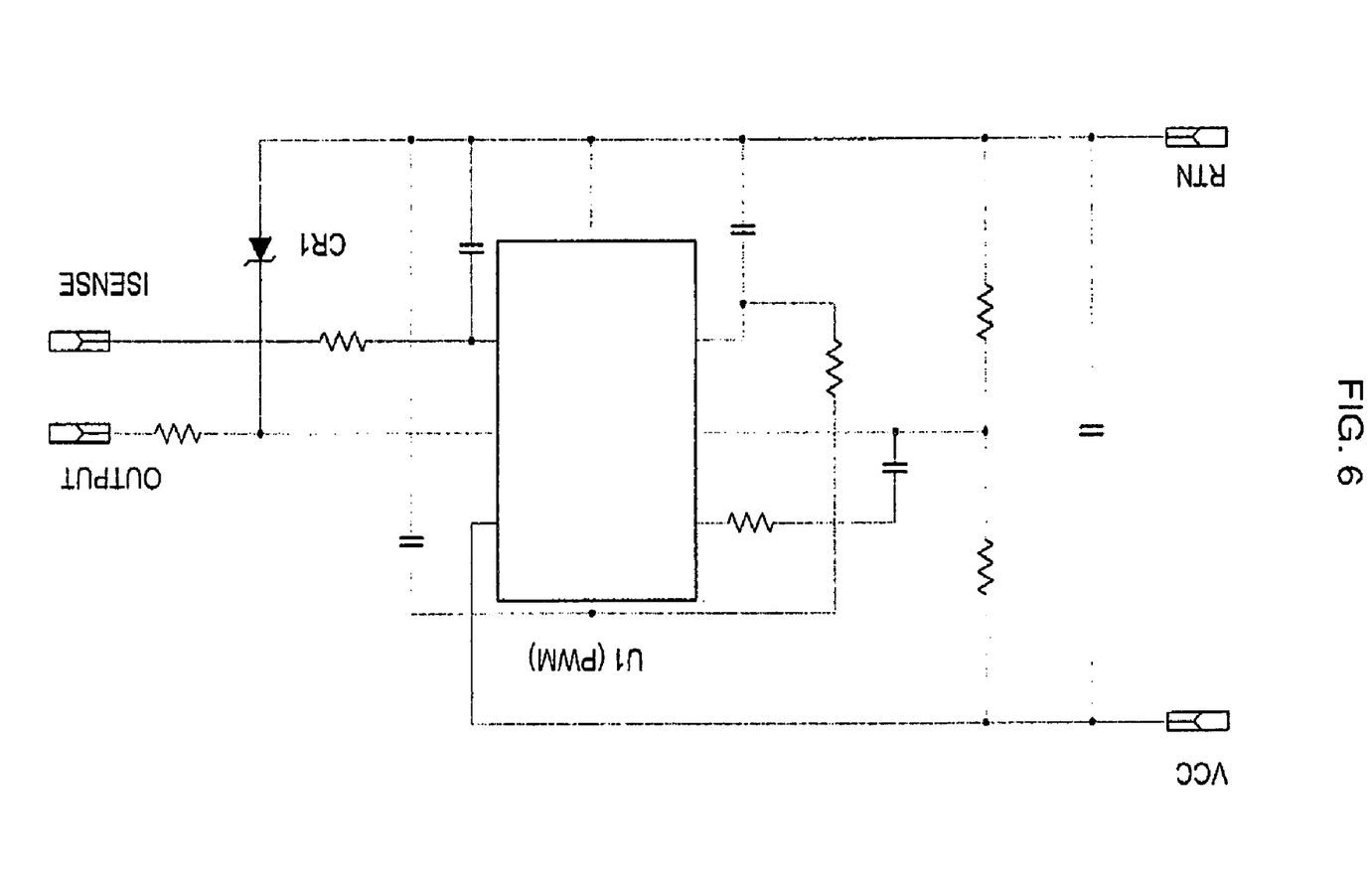
FIG. 6. Schematic of a preferred embodiment of an bias converter control board.

Q3 and the bias control (FIG. 6) provide the various voltages needed for the separate control circuits via windings on the bias transformer T1 and linear regulators. U1 controls the fan voltage which increases when thermal switch, TS1, opens to speed up the fan as the internal temperature increases at higher power levels. This avoids unnecessary noise at lower power levels.

Q2, L3 and CR4 comprise the buck circuit, which, when driven through T2 and the buffer stage of Q4 and Q5 with pulse width information from the front panel converts the constant 380 volts DC on C15 and C16 to a lower constant voltage on C1. The voltage across C1 provides the bus voltage for the dual forward converter shown on FIG. 2. This bus voltage is automatically controlled to keep the final output voltage constant at the setting programmed by the manual front panel control.

Figure 2A:
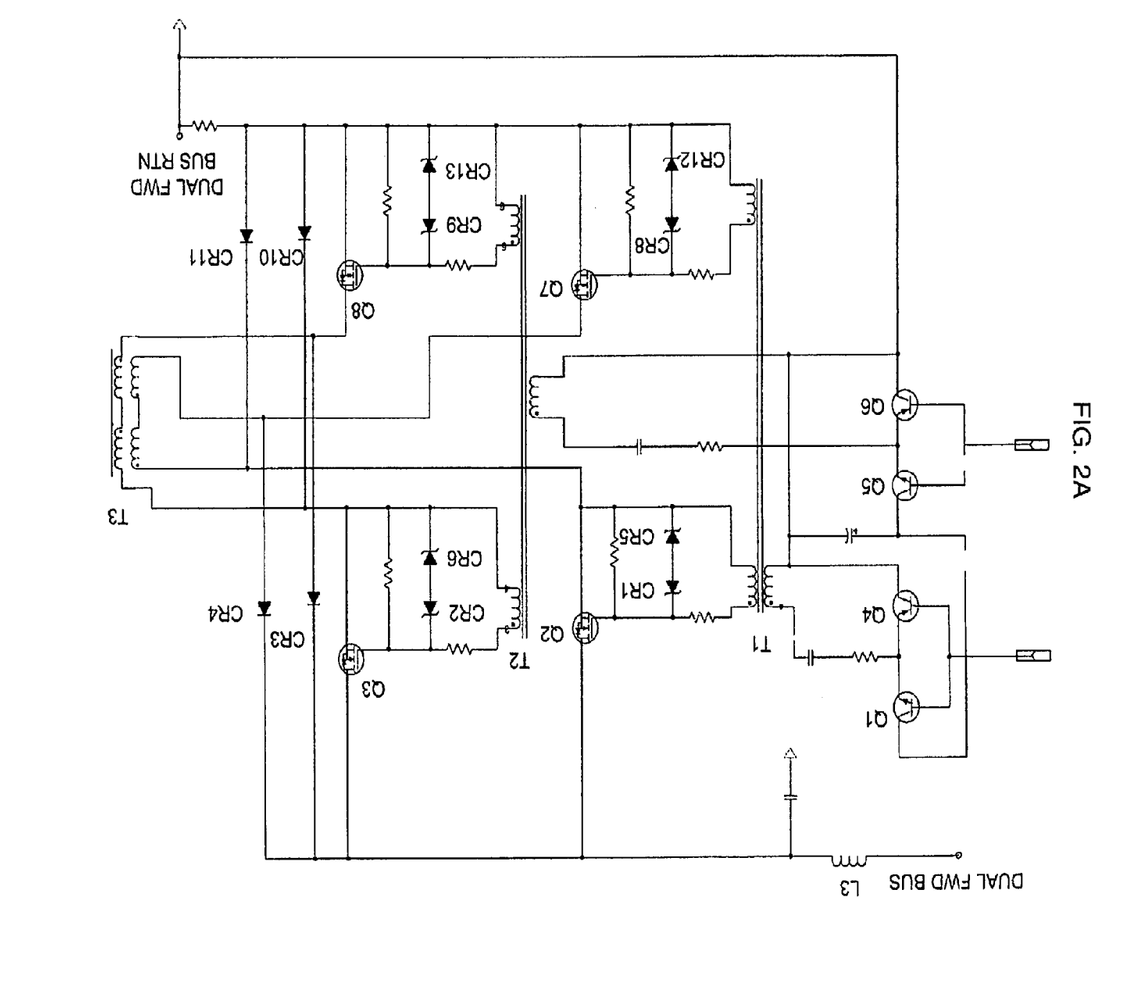
Figure 2B:
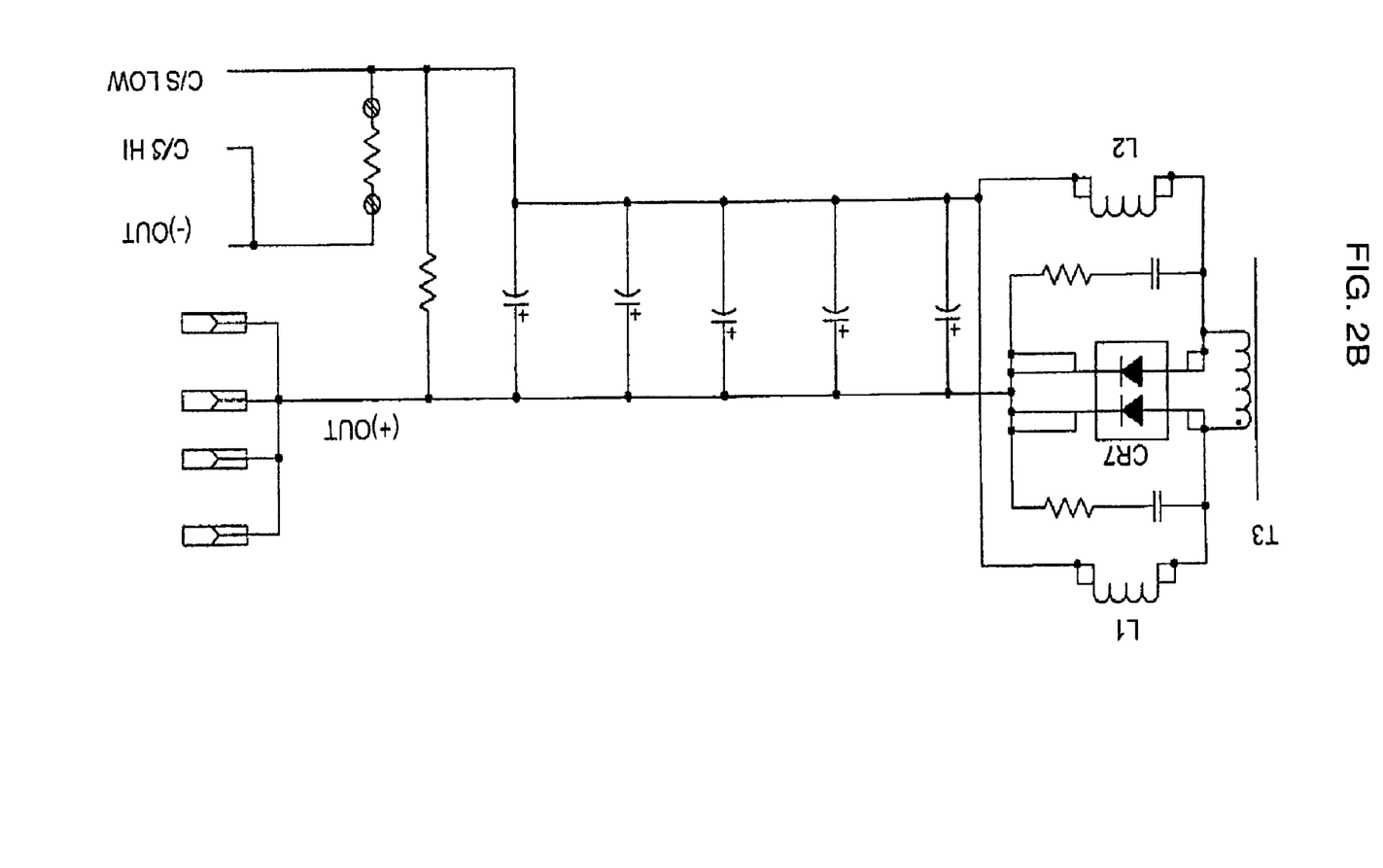
Figure 5:
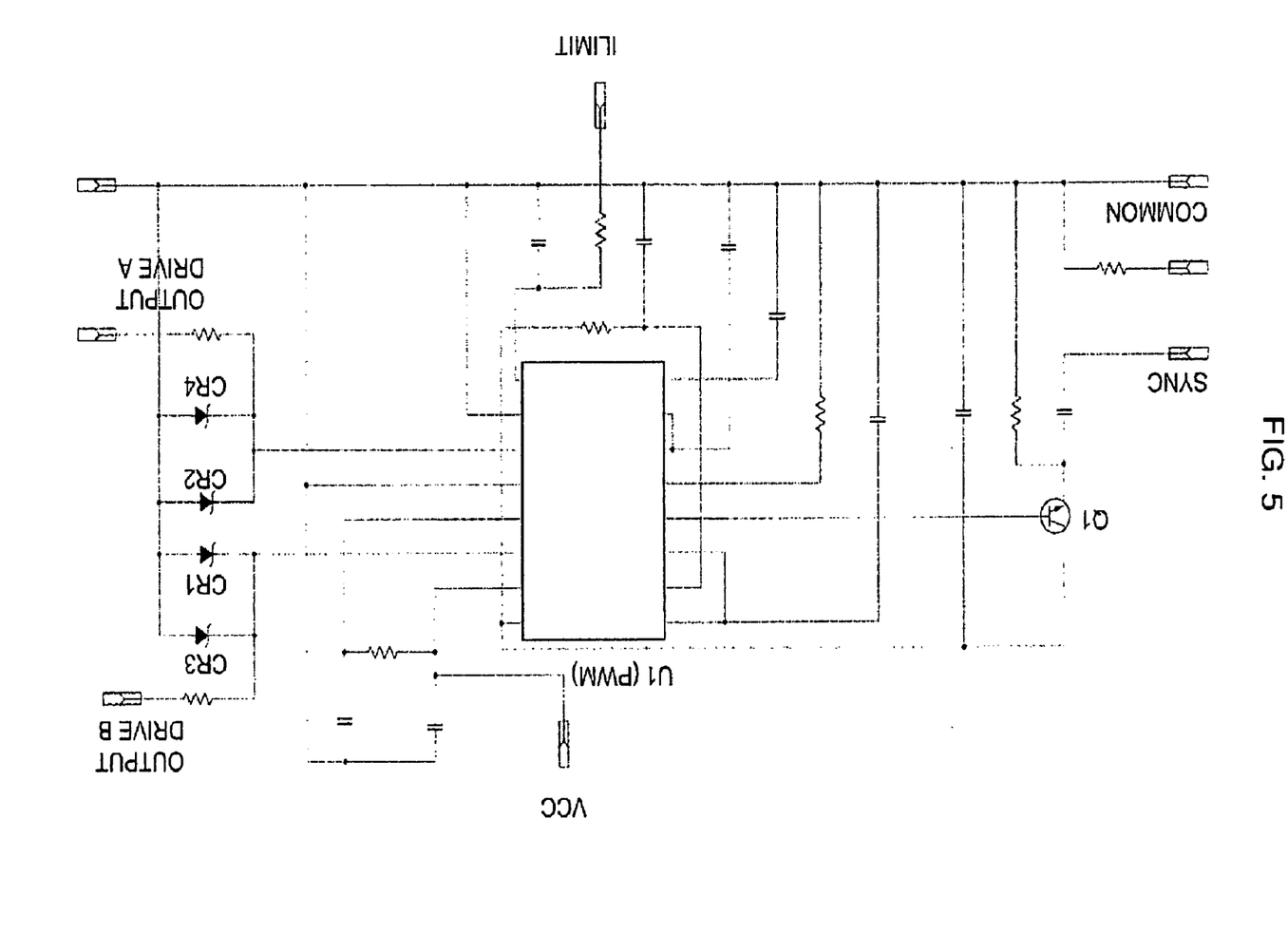
FIG. 5. Schematic of a preferred embodiment of an dual forward (push-pull) control board.

On the output board, the dual forward converter is comprised of two transistor pairs, Q2 and Q7, and Q3 and Q8, driven by the push-pull control, FIG. 5. Each pair has its own primary winding on the main output isolation transformer, T3. There is no pulse width modulation except for power limiting, and so each pair is turned on for approximately 45% of the period so that the bus voltage is impressed alternately across each primary winding in the manner of a push-pull converter. The fact that the each pair of transistors is turned on for nearly half the cycle with little dead time means that the action of one pair turning off drives the other pair via transformer coupling into the correct state for them to be turned on with no voltage across them, and thus zero voltage switching is achieved. The output of the transformer is applied alternately across each diode of CR7 and inductors L1 and L2 which together form a current doubling circuit. This halves the average current in the secondary winding of T3, and reduces the output ripple voltage. C7,8,9,10 and 11 filter the output, and R10 is a 100 amp current shunt for sensing the output current. The voltage across R10 drives the current display directly so there are no amplifier errors in the reading.

Figure 3A:
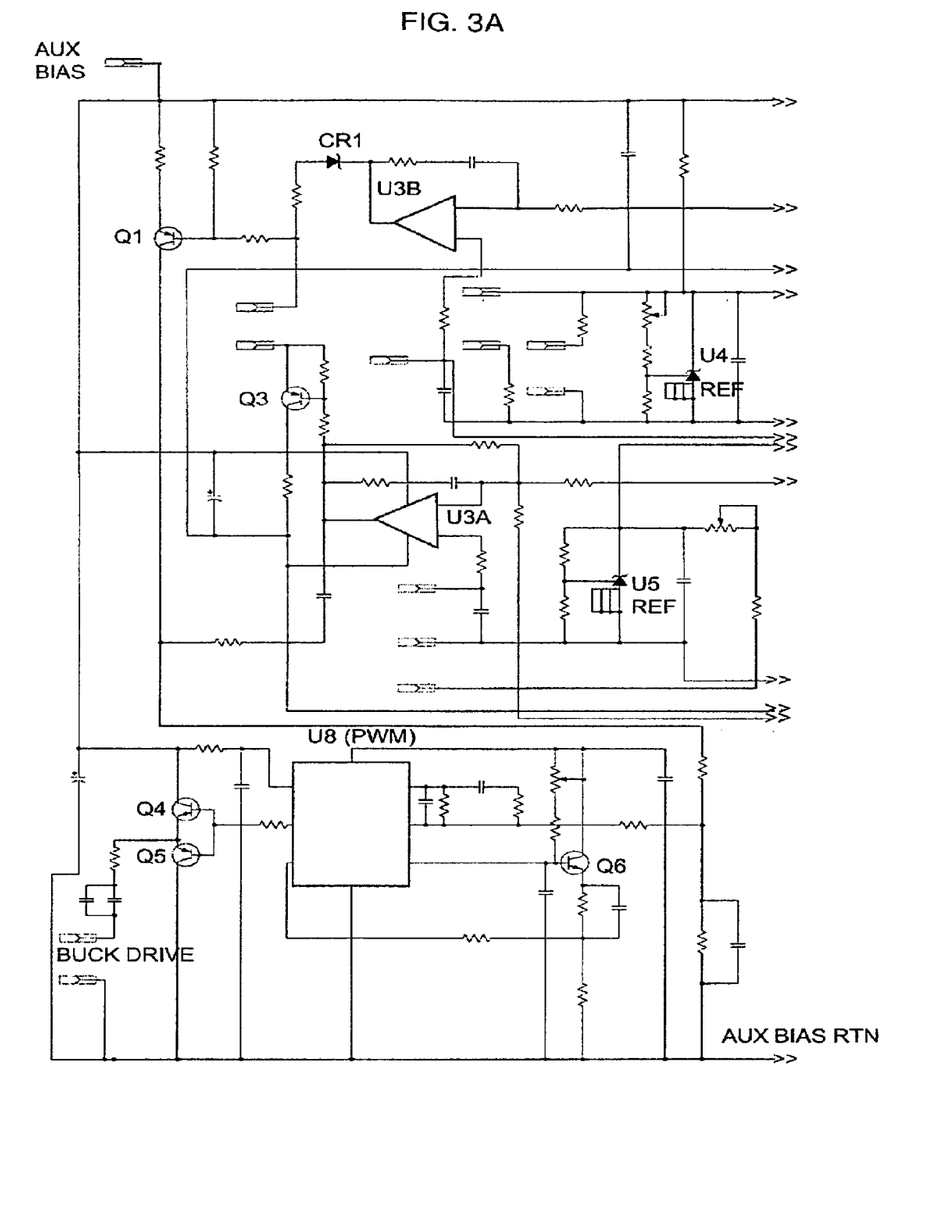
Figure 3B:
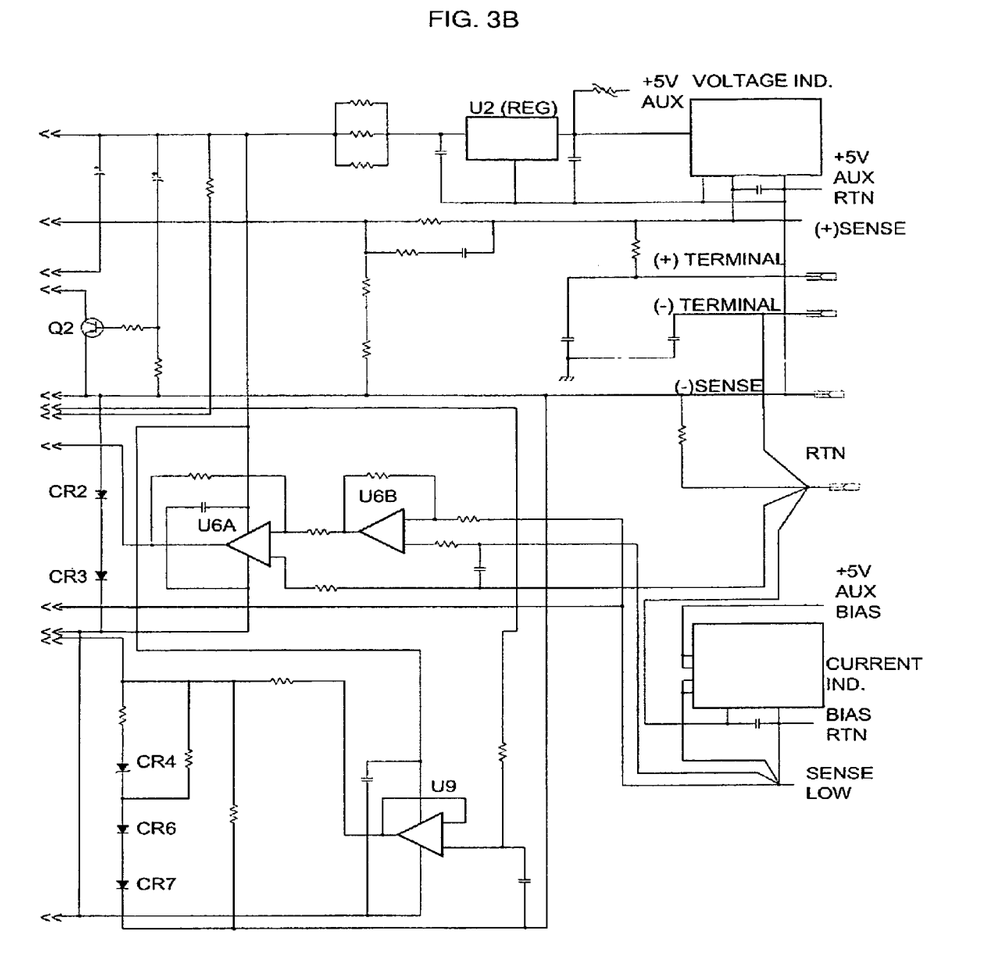

FIG. 3 shows the front panel control board schematic and the voltage and current indicators. U3B compares the divided output voltage with a reference voltage set by the front panel coarse and fine manual voltage controls. The output of the amplifier sets the pulse width output of the PWM I.C. U8 via Q1. This PWM drives the buck regulator which controls the bus voltage of the dual forward converter which in turn determines the output voltage, and thus the loop is closed. Remote sensing is available on the front panel at J2-1 and J2-2.

U3-A is the current amplifier which compares the voltage corresponding to the output current, buffered by U6-A and B, with a reference set by the front panel current control. This reference is modified to a greater or lesser extent by the output voltage which is buffered by U-9A, shaped by R49, R52, CR4, CR6 and CR7 and summed in via R38. As the output voltage is increased the control range of the manual current control is decreased, so that the current limit goes down. In this way, the maximum current at 6.6 volts is 60 amps, and the maximum current at 75 volts is 5.3 amps.

An auxiliary 5 volt output is provided via RT1 which acts as a re-settable fuse at over 0.5 amps.

The subject invention in this preferred embodiment has a maximum output voltage of 75 volts DC, and maximum output current of 60 amps subject to a power limit of 400 watts, but the principle of the invention is not limited and can be applied to other voltage, current and power ranges. It is the particular combination of circuitry both novel and well known that allows the wide range to be achieved. The input AC power is filtered and power factor corrected to meet international harmonic current standards. This PFC stage provides a constant boosted voltage on storage capacitors of 380 volts DC, which is then converted to a lower DC voltage by a buck converter. This lower voltage provides the bus voltage for the dual forward converter output stage, and the bus voltage is regulated in response to the input from the front panel control circuit to maintain the desired output voltage or current. The dual forward converter operates at full duty cycle as a push-pull chopper to drive the primary windings of the main output isolation transformer. This, in combination with a current doubler output rectifier circuit, provides an output with very little ripple after capacitive filtering. The method of driving the dual forward convert ensures zero voltage switching of the power transistors for high efficiency. The front panel control includes the means to manually set the desired output voltage and maximum current. Once the setting is input by the manual controls, the values remain fully regulated at their setting up to the power limit. This power limit is a novel circuit that uses the inverted voltage from the voltage control potentiometers as a reference for the current limit so that as the output voltage is programmed higher, the current limit is automatically programmed lower. Shaping circuits ensure an approximate constant product of current and voltage. Individual current and voltage indicators are provided on the front panel. The unit includes a thermally controlled fan which runs at low speed at low power, and speeds up if the internal temperature rises at higher power levels.

While certain embodiments are illustrated in the drawings and described herein, including preferred embodiments, it will be apparent to those skilled in the art that the specific embodiments described herein may be modified without departing from the inventive concepts described:

A Totally Enclosed Input AC Filter Ensures Class B Emission Limits Are Met.

The invention claimed is:

1. A dual forward converter which comprises:
   four transistor switch means in two pairs;
   each pair is turned on for half the total switching period to impress a buck converter controlled voltage across on one primary winding of the main power transformer;
   said transistors in each pair are turned on simultaneously for half the switching cycle, then the transistors of the second pair are turned on simultaneously for the second half of the switching cycle;
   each pair of switching transistor means has a separate primary winding on the main transformer arranged in opposite polarity so as to act as a full bridge topology without the reliability issues associated with having two pairs of transistors in series across the main DC supply rails, specifically with a transformer winding between the top and bottom transistor in each pair;
   said action of one transistor pair turning off places a near zero voltage across the second pair by transformer action, meaning that each pair turns on in a zero voltage mode which reduces losses and high frequency switching noise;
   power isolation transformer means has a secondary winding to deliver output power via a current doubler circuit, thus eliminating the need for a center tapped winding, and reduces the ripple current in the secondary filter circuit.

2. A method of control which automatically limits the power output to 400 W regardless of the output voltage with an absolute limit of 60 amps and 75 volts comprising;
   a buck converter controlled manually from front panel controls, to set the voltage across the dual forward converter of claim 1;
   said output of the buck converter is set from zero to 180V DC to give an output voltage from zero to 75V DC;
   said method of control uses a constant power curve means to control the applied pulse width of the modulator thus ensuring that the product of output voltage and current is limited to 400 watts;
   said control means is coupled to the main buck transistor switch by a gate drive transformer ensuring safety and noise isolation.

* * * * *